(12) United States Patent
Iwata et al.

(10) Patent No.: US 8,736,803 B2
(45) Date of Patent: May 27, 2014

(54) MOTHER PANEL WHEREIN A SEALING MATERIAL INCLUDES A FIRST SEALING MATERIAL AND A SECOND SEALING MATERIAL WHEREIN THE FIRST AND SECOND SEALING MATERIAL ENABLES AIR TIGHT SEALING WITHIN A PERIPHERY OF THE MOTHER PANEL

(75) Inventors: Toshiro Iwata, Chosei (JP); Takahiro Nagami, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 611 days.

(21) Appl. No.: 12/749,654

(22) Filed: Mar. 30, 2010

(65) Prior Publication Data

US 2010/0259707 A1 Oct. 14, 2010

(30) Foreign Application Priority Data

Apr. 10, 2009 (JP) ................................. 2009-095629

(51) Int. Cl.
*G02F 1/1339* (2006.01)
*G02F 1/1341* (2006.01)

(52) U.S. Cl.
USPC ............................ 349/154; 349/189; 349/190

(58) Field of Classification Search
USPC .......................... 349/153, 154, 187, 189, 190
See application file for complete search history.

(56) References Cited

U.S. PATENT DOCUMENTS

2003/0086050 A1* 5/2003 Lee et al. ....................... 349/153
2006/0172636 A1* 8/2006 Bech ................................ 442/1

FOREIGN PATENT DOCUMENTS

JP  2003-043501  2/2003
JP  2004-317983  11/2004

* cited by examiner

*Primary Examiner* — Paul Lee
(74) *Attorney, Agent, or Firm* — Antonelli, Terry, Stout & Kraus, LLP.

(57) ABSTRACT

A mother TFT substrate having plural TFT substrates, and a mother counter substrate having plural counter substrates are bonded together to form a mother panel. At this time, the interior of the mother panel is sealed only with a sealing material, without forming a sealant separately in seal portions. The mother counter substrate has plural counter substrates of liquid crystal cells. A sealing material is arranged in two rows surrounding the counter substrates in the periphery of the mother counter substrate, except for the seal portions in which seal portion sealing materials are arranged in two rows in a staggered manner on the short sides. When the mother counter substrate and the mother TFT substrate are overlapped and the inside air is let out, the sealing materials are heated. Then, the seal portion sealing materials are bridged together to seal the interior of the mother panel.

6 Claims, 12 Drawing Sheets

SC

SM

MOTHER PANEL WHEREIN A SEALING MATERIAL INCLUDES A FIRST SEALING MATERIAL AND A SECOND SEALING MATERIAL WHEREIN THE FIRST AND SECOND SEALING MATERIAL ENABLES AIR TIGHT SEALING WITHIN A PERIPHERY OF THE MOTHER PANEL

CLAIM OF PRIORITY

The present application claims priority from Japanese Patent Application JP 2009-095629 filed on Apr. 10, 2009, the content of which is hereby incorporated by reference into this application.

FIELD OF THE INVENTION

The present invention relates to a display device, and more particularly to a technology for manufacturing a small and thin liquid crystal display device with high efficiency and high yield.

BACKGROUND OF THE INVENTION

In a liquid crystal display device, a TFT substrate includes pixel electrodes, thin film transistors (TFTs), and the like, arranged in a matrix form. A counter substrate includes color filters, and the like, arranged at positions corresponding to the pixel electrodes of the TFT substrate. Liquid crystal is interposed between the TFT substrate and the counter substrate. In this configuration, the liquid crystal display device forms an image by controlling the transmittance of light of the liquid crystal molecules for each pixel.

The liquid crystal display device is flat and light weight, and is used in a wide range of applications in various fields. Small liquid crystal display devices are widely used in electronic devices such as mobile phone and DSC (Digital Still Camera). In the electronic devices such as mobile phone and DSC, there is a demand for reducing the thickness of the whole device in addition to reducing the weight. This leads to a strong demand for using a liquid crystal display device with the entire thickness reduced.

It is not efficient if small liquid crystal display devices are manufactured individually. Thus, the following method is used in order to increase the manufacturing efficiency. First, a mother TFT substrate in which a large number of TFT substrates are formed is manufactured. Also, a mother counter substrate in which a large number of counter substrates are formed is manufactured. Then, the mother TFT substrate and the mother counter substrate are bonded together to form a mother panel. Then, individual liquid crystal cells are cut off from the mother panel.

Meanwhile, in order to meet the demand for reducing the thickness of the liquid crystal display panel, it is necessary to reduce the thicknesses of the TFT substrate and the counter substrate that constitute the liquid crystal display panel. In recent years, the thickness of the TFT substrate or the counter substrate has been reduced to about 0.2 mm, or in some cases to about 0.15 mm. However, such a thin glass plate is not available as a standardized product. In addition, such a thin glass substrate has a low strength, and is difficult to be processed in the manufacturing process.

For this reason, a standardized glass substrate of 0.5 mm or 0.4 mm is used in the stage of forming a mother TFT substrate or mother counter substrate. Then, the mother TFT substrate and the mother counter substrate are bonded together to form a mother panel. Then, the outside of the mother panel is polished to reduce the thickness. The polishing is performed in combination of mechanical and chemical polishing methods. The mother TFT substrate or mother counter substrate is polished to a thickness of about 0.15 mm to 0.25 mm.

The chemical polishing tends to first polish the end portion of the glass substrate. Thus, after the chemical polishing, the thickness of the end portion of the mother panel is small. In particular, the mechanical strength is reduced in this portion, which is likely to cause a crack or cleft. Scribing is performed based on the outline of the mother panel in separating the individual liquid crystal cells from the mother panel. When the end portion of the mother panel is weakened and is cracked or damaged, the accuracy of the scribing is reduced.

JP-A No. 317983/2004 describes a technology that forms a coating portion of resin in a peripheral end portion of the mother panel, preventing the occurrence of such a thin end portion of the mother panel when the thickness of the mother panel is reduced by the chemical polishing. In this way, the technology of JP-A No. 317983/2004 is designed to ensure the thickness and strength of the end portion of the mother panel to increase the accuracy of the scribing.

SUMMARY OF THE INVENTION

When the thickness of the mother panel is reduced by polishing, the mother panel is soaked in a chemical polishing solution. At this time, if the chemical polishing solution penetrates into the interior of the mother panel, a large number of liquid crystal cells formed in the mother panel will be destroyed. In order to prevent this, a sealing material is formed between the mother TFT substrate and the mother counter substrate in the periphery of the mother panel. In this way, the chemical polishing solution does not penetrate into the interior of the mother panel.

An exhaust hole is provided to let out the air inside the mother panel when the mother TFT substrate and the counter substrate are bonded together. Then, the exhaust hole is sealed with a sealant, so that the interior of the mother panel is airtight. The airtight mother panel is soaked in the chemical polishing solution, and is chemically polished. Then, the outside of the mother TFT substrate and the mother counter substrate is polished to reduce the thickness of the mother panel.

Such a conventional process has the following problems. The first problem is that it is necessary to have a step of sealing the exhaust hole of the mother panel with a sealant. The second problem is that as the portion of the glass substrate in which the sealant is formed is not polished by chemical polishing, the thickness of this portion is increased. In other words, the thickness of the mother panel is not uniform as a whole. The non-uniformity of the thickness of the mother panel reduces the accuracy of the scribing in separating the individual liquid crystal cells from the mother panel.

FIGS. 6, 7, 8A and 8B are top views showing the method for forming a conventional mother panel. FIG. 6 is a top view of a mother counter substrate 200 according to the conventional method. In FIG. 6, the mother counter substrate 200 has counter substrates 20 for manufacturing 5×4=20 liquid crystal cells. In the mother counter substrate 200, liquid crystal cell sealing materials 30 are formed corresponding to the individual liquid crystal cells.

A sealing material 400 is doubled in the periphery of the mother counter substrate 200 to protect the liquid crystal cells from the chemical polishing solution. On a short side of the mother counter substrate 200, an exhaust hole 350 is formed with exhaust portion sealing materials 300, to exhaust the inside air when a mother TFT substrate 100 and the mother counter substrate 200 are bonded together.

FIG. 7 is a top view showing a state in which the mother counter substrate 200 and the mother TFT substrate 100 are bonded together with the exhaust hole 350 being sealed by a sealant 500. In FIG. 7, scribing lines 150 are provided corresponding to the individual liquid crystal cells. The liquid crystal cell sealing materials 30 are formed in the individual liquid crystal cells. After the mother counter substrate 200 and the mother TFT substrate 100 are bonded together, the exhaust hole portion is sealed with the sealant 500. Then, the mother panel is completed.

The interior of the mother panel is airtight by forming the sealant 500. When the mother panel in this state is soaked in the chemical polishing solution, only the outside of the mother counter substrate 200 and mother TFT substrate 100 is polished. Then, when the mother counter substrate 200 and mother TFT substrate 100 is polished to a predetermined thickness, the polishing is finished. Then, scribing is performed along the scribing lines 150 to separate the individual liquid crystal cells from the mother panel.

FIGS. 8A and 8B are enlarged views of the portion corresponding to the exhaust hole 350 or the sealant 500. FIG. 8A is a partial top view of the inside of the mother counter substrate 200. In FIG. 8A, the exhaust hole 350 is formed in the mother counter substrate 200, with the seal portion sealing materials 300 formed inside the exhaust hole 350. The mother TFT substrate 100 is bonded to the mother counter substrate 200 in this state. When the mother TFT substrate 100 and the mother counter substrate 200 are bonded together, the inside air is let out through the exhaust hole 350. Then, the exhaust hole 350 is sealed with the sealant 500.

FIG. 8B shows the state in which the exhaust hole 350 is sealed with the sealant 500. The interior of the mother panel is airtight with the sealant 500, preventing the polishing solution from penetrating into the interior of the mother panel. However, the portion of the glass in which the sealant 500 exists is not polished. The thickness of this portion is greater than the other portion of the glass, and the non-uniformity of the thickness occurs in the mother panel. As a result, the accuracy of the scribing is reduced, and the manufacturing yield of the liquid crystal display device is reduced.

The present invention aims to solve the above identified problem, and to provide a liquid crystal display device with a simplified manufacturing process and a high manufacturing yield.

The present invention overcomes the above problem by means described in detail below.

(1) There is provided a mother panel having a mother TFT substrate, a mother counter substrate bonded to the mother TFT substrate, and plural liquid crystal cells. The mother TFT substrate and the mother counter substrate are bonded together with a sealing material provided in the periphery surrounding the plural liquid crystal cells. The sealing material includes a seal portion sealing material as well as sealing a material of the other portion. The sealing material of the other portion is arranged in two rows. The seal portion sealing material is arranged in two rows. A width of the seal portion sealing material is greater than a width of the sealing material of the other portion. No sealant other than the seal portion sealing material is formed in the portion of the seal portion sealing material.

(2) There is provided a mother panel having a mother TFT substrate, a mother counter substrate bonded to the mother TFT substrate, and plural liquid crystal cells. The mother TFT substrate and the mother counter substrate are bonded together with a sealing material provided in the periphery surrounding the plural liquid crystal cells. The sealing material includes a seal portion sealing material as well as a sealing material of the other portion. The sealing material of the other portion is arranged in two rows. The seal portion sealing material is arranged in a single row. A width of the seal portion sealing material is greater than a width of the sealing material of the other portion. No sealant other than the seal portion sealing material is formed in the portion of the seal portion sealing material.

(3) There is provided a mother panel having a mother TFT substrate, a mother counter substrate bonded to the mother TFT substrate, and plural liquid crystal cells. The mother TFT substrate and the mother counter substrate are bonded together with a sealing material provided in the periphery surrounding the plural liquid crystal cells. The sealing material includes a seal portion sealing material as well as a sealing material of the other portion. The sealing material of the other portion is arranged in two rows. The seal portion sealing material is arranged in a single row with a substantially crank shape. No sealant other than the seal portion sealing material is formed in the portion of the seal portion sealing material.

(4) There is provided a method of manufacturing a mother panel having a mother TFT substrate, a mother counter substrate bonded to the mother TFT substrate, and plural liquid crystal cells. The method includes a step of forming, on the mother TFT substrate, plural TFT substrates, in which pixels each having a pixel electrode and a TFT are arranged in a matrix form. The method also includes a step of forming a sealing material in a peripheral portion of the mother counter substrate to bond to the mother TFT substrate. The sealing material includes a seal portion sealing material as well as a sealing material of the other portion. Gaps between the seal portion sealing materials constitute an exhaust hole. When a predetermined time has passed after the mother TFT substrate and the mother counter substrate are overlapped with each other, the mother TFT substrate and the mother counter substrate are bonded together by heating the seal portion sealing materials and the sealing material of the other portion. Then, the seal portion sealing materials are bridged together to seal the exhaust hole.

(5) There is provided a method of manufacturing a mother panel having a mother TFT substrate, a mother counter substrate bonded to the mother TFT substrate, and plural liquid crystal cells. The method includes a step of forming, on the mother TFT substrate, plural TFT substrates, in which pixels each having a pixel electrode and a TFT are arranged in a matrix form. The method also includes a step of forming a sealing material in a peripheral portion of the mother counter substrate to bond to the mother TFT substrate. The sealing material includes a seal portion sealing material as well as a sealing material of the other portion. The seal portion sealing materials are arranged in parallel in islands. Gaps between the seal portion sealing materials constitute an exhaust hole. When a predetermined time has passed after the mother TFT substrate and the mother counter substrate are overlapped with each other, the mother TFT substrate and the mother counter substrate are bonded together by heating the seal portion sealing materials and the sealing material of the other portion. Then, the seal portion sealing materials are bridged together to seal the exhaust hole.

(6) There is provided a method of manufacturing a mother panel having a mother TFT substrate, a mother counter substrate bonded to the mother TFT substrate, and plural liquid crystal cells. The method includes a step of forming, on the mother TFT substrate, plural TFT substrates, in which pixels each having a pixel electrode and a TFT are arranged in a matrix form. The method also includes a step of forming a sealing material in the peripheral portion of the mother counter substrate to bond to the mother TFT substrate. The sealing material includes a seal portion sealing material as well as a sealing material of the other portion. The seal portion sealing materials are arranged in a staggered manner. Gaps between the sealing materials arranged in a staggered manner constitute an exhaust hole. When a predetermined time has passed after the mother TFT substrate and the mother counter substrate are overlapped with each other, the mother TFT substrate and the mother counter substrate are bonded together by heating the seal portion sealing materials and the sealing material of the other portion. Then, the seal portion sealing materials are bridged together to seal the exhaust hole.

(7) There is provided a method of manufacturing a liquid crystal display device having a TFT substrate in which pixels including pixel electrodes and TFTs are arranged in a matrix form, and a counter substrate. The method includes a step of forming, on the mother TFT substrate, plural TFT substrates, in which pixels each having a pixel electrode and a TFT are arranged in a matrix form. The method also includes a step of forming a sealing material in a peripheral portion of the mother counter substrate to bond to the mother TFT substrate. The sealing material includes a seal portion sealing material as well as a sealing material of the other portion. Gaps between the seal portion sealing materials constitute an exhaust hole. When a predetermined time has passed after the mother TFT substrate and the mother counter substrate are overlapped with each other, the mother TFT substrate and the mother counter substrate are bonded together by heating the seal portion sealing materials and the sealing material of the other portion. At the same time, the seal portion sealing materials are bridged together to seal the exhaust hole. Then, the mother panel is polished to reduce a thickness. Then, the mother panel is separated into the individual liquid crystal cells.

According to the present invention, the mother TFT substrate and the mother counter substrate can be bonded and sealed together without forming a sealant separately. Thus, it is possible to omit the steps of forming and removing the sealant.

Further, according to the present invention, no sealant is formed. Thus, when the mother panel is polished, it is possible to uniformly polish the mother TFT substrate or the mother counter substrate. This makes it possible to increase the accuracy of the scribing in separating the individual liquid crystal cells from the mother panel. As a result, it is possible to increase the manufacturing yield of the liquid crystal display device.

DETAILED DESCRIPTION OF THE PREFERRED EMBODIMENTS

Hereinafter, the present invention will be described in detail through embodiments.

First Embodiment

Figure 1:
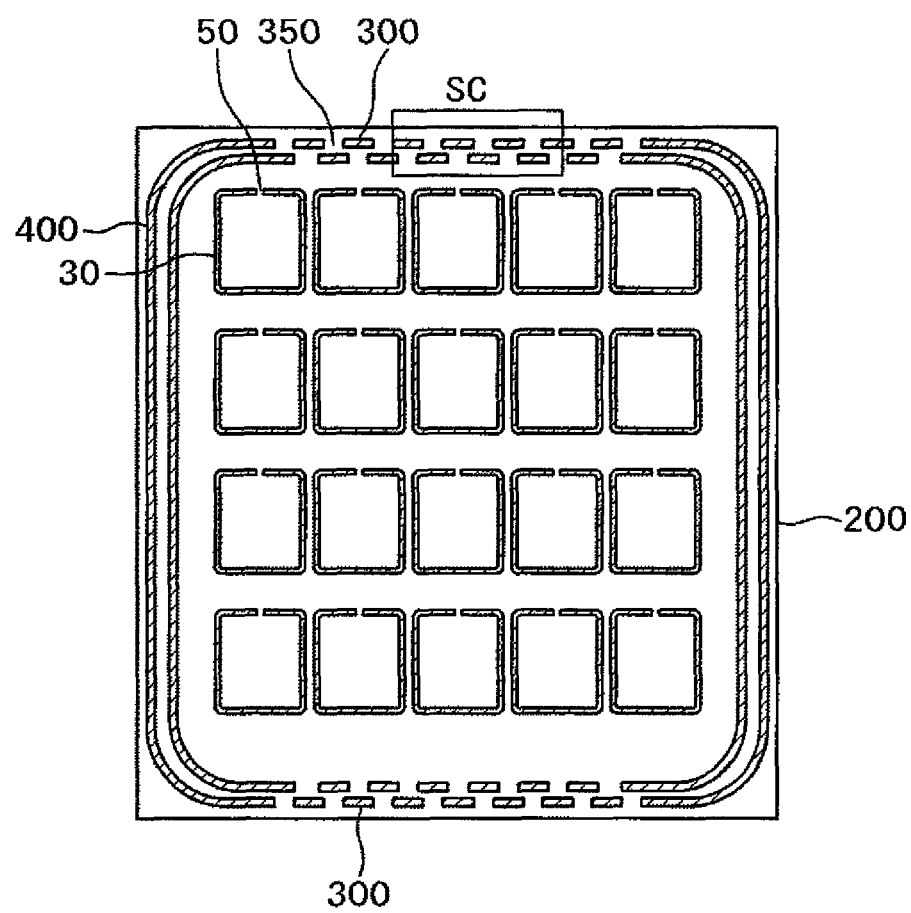
FIG. 1 is a top view of a mother counter substrate according to the present invention.

FIG. 1 is a top view of a mother counter substrate 200 according to the present invention. FIG. 1 is viewed from a side of the mother counter substrate 200 to which a mother TFT substrate 100 is bonded. In FIG. 1, a sealing material 400 is doubled in the periphery of the mother counter substrate 200. In this way, when the mother counter substrate 200 and the mother TFT substrate 100 are bonded together and soaked in a chemical polishing solution, it is possible to ensure that the chemical polishing solution does not penetrate into the interior of a mother panel.

An exhaust hole 350 and seal portion sealing materials 300 are formed on two short sides of the mother counter substrate 200. The exhaust hole 350 is formed to let inside air out when the mother TFT substrate 100 and the mother counter substrate 200 are bonded together. The seal portion sealing materials 300 are formed in the portion of the exhaust hole 350. The seal portion sealing materials 300 are arranged in two rows in a staggered manner. The inside air is exhausted though the gaps between the staggered seal portion sealing materials 300. In this case, the term "exhausted" does not necessarily mean to be exhausted to a vacuum. It means that the inside air is let out so that the air is not confined in the interior of the mother panel with a greater pressure than the atmosphere.

Inside the doubled sealing material 400, liquid crystal cell sealing materials 30 are formed respectively corresponding to 20 liquid crystal cells. Each of the liquid crystal cell sealing materials 30 has a filling hole 50 to fill liquid crystal into the liquid crystal cell. The mother counter substrate 200 and the mother TFT substrate 100 are bonded together with the doubled sealing material 400 formed in the periphery of the mother counter substrate 200, and with the liquid crystal sealing materials 30 corresponding to the individual liquid crystal cells. Both the sealing material 400 and the liquid crystal cell sealing material 30 can be formed by a dispenser or screen print method. This is the same for the following embodiments.

Figure 2:
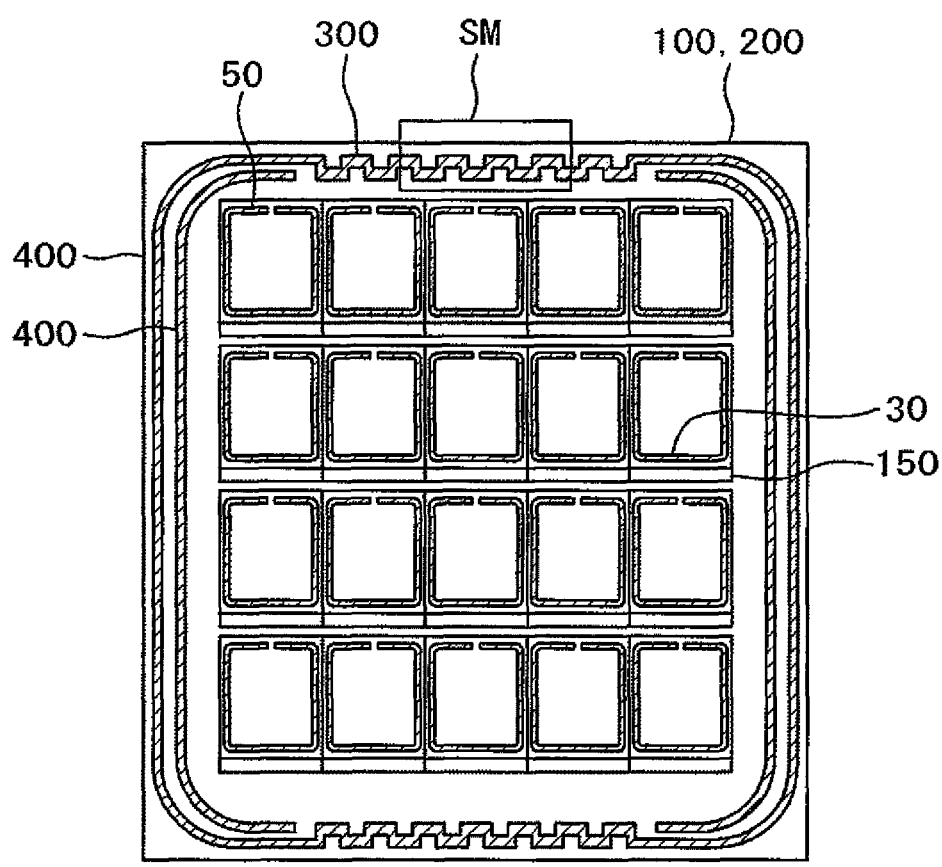
FIG. 2 is a top view of a mother panel according to the present invention.

FIG. 2 shows the state in which the mother counter substrate 200 and the mother TFT substrate 100 are bonded together to complete the mother panel. As shown in FIG. 2, the exhaust hole 350, which is formed to let out the air between the mother TFT substrate 100 and the mother counter substrate 200, as shown in FIG. 1, is sealed without using a sealant. In other words, when the mother TFT substrate 100 and the mother counter substrate 200 are bonded and heated, the seal portion sealing materials 300 arranged in a staggered manner as shown in FIG. 1 spread and are connected to each other. Then, the interior of the mother panel is automatically air tightly sealed.

The process of performing such a sealing is as follows. First, the mother TFT substrate 100 and the mother counter substrate 200 are bonded together. At this time, since the staggered seal portion sealing materials 300 do not come into contact with each other, the inside and outside of the mother panel communicate with each other. Thus, the air inside the mother panel is let out through the exhaust hole 350.

After the inside air is let out through the exhaust hole 350, the mother panel is heated. The doubled sealing material 400 and the seal portion sealing materials 300 are melted and spread in the width direction. At this time, the staggered seal portion sealing materials 300 come into contact with each other, and are bridged to seal the interior of the mother panel. In this state, the mother panel is soaked in the chemical polishing solution. Because the interior of the mother panel is sealed, the chemical polishing solution does not penetrate into the interior of the mother panel. Thus, the liquid crystal cells are not impaired by the chemical polishing solution.

Figure 3A:
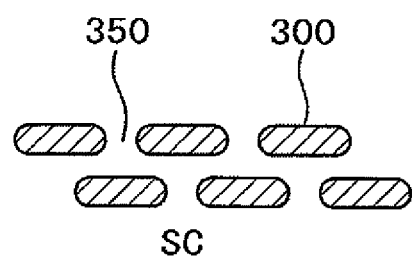
FIGS. 3A and 3B are top views showing seal portion sealing materials of the mother counter substrate, and showing the seal portion sealing materials in the state of the mother panel.
Figure 3B:
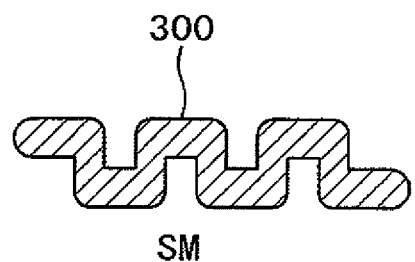

FIGS. 3A and 3B are schematic top views showing the change in the state of the seal portion in the mother panel according to the present invention. FIG. 3A corresponds to SC of FIG. 1, showing the shape of the seal portion sealing materials 300 in the mother counter substrate 200. The gaps between the seal portion sealing materials 300 constitute the exhaust hole 350. FIG. 3B corresponds to SM of FIG. 2. FIG. 3B is a top view of the seal portion in the state in which the mother TFT substrate 100 and the mother counter substrate 200 are bonded together to complete the mother panel. As shown in FIG. 3B, in the state of the mother panel, the seal portion sealing materials 300 are bridged together to form a crank shape of the seal portion sealing materials 300.

FIG. 3B shows a uniform crank shape. However, the actual shape of the seal portion sealing materials 300 is often less uniform. Either the shape of the seal portion sealing materials 300 is a crank shape or is less uniform, it is important that the staggered seal portion sealing materials 300 of the mother counter substrate are connected to each other to seal the exhaust hole 350, and that the interior of the mother panel is blocked from the outside. In other words, it is important that the interior of the mother panel is blocked from the outside without using a sealant.

Returning to FIG. 2, in which 3×4=20 liquid crystal cells are formed inside the doubled sealing material 400 of the mother panel. In FIG. 2, scribing lines 150 are provided for the individual liquid crystal cells. At this time, seal holes 50 of the individual liquid crystal cells are not sealed yet. In this state, the mother panel is soaked in the chemical polishing solution to perform chemical polishing.

Figure 4:
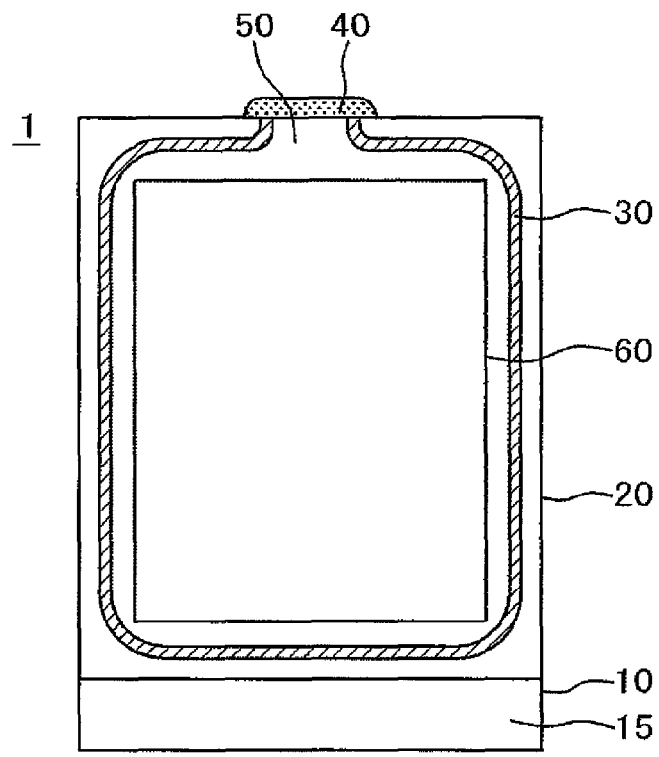
FIG. 4 is a top view of a liquid crystal cell.

After the thickness of the mother counter substrate 200 or the mother TFT substrate 100 is reduced to about 0.2 mm by chemical polishing, the individual liquid crystal cells are separated from the mother panel along the scribing lines 150 shown in FIG. 2. FIG. 4 is a top view of a liquid crystal cell 1 that is separated from the mother panel by scribing, and then is filled with liquid crystal.

In FIG. 4, a TFT substrate 10 and a counter substrate 20 are bonded together by the liquid crystal cell sealing material 30. Both the TFT substrate 10 and the counter substrate 20 have been polished to the thickness of 0.2 mm. A display area 60 is formed inside the liquid crystal cell sealing material 30. In the display area 60 of the TFT substrate 10, pixels including pixel electrodes and TFTs are arranged in a matrix form. Further, in the display area 60 of the counter substrate 20, color filters are formed at positions corresponding to the pixels of the TFT substrate 10.

The TFT substrate 10 is formed greater than the counter substrate 20. A terminal portion 15 is provided in the portion of the TFT substrate 10 extending beyond the counter substrate 20. The terminal portion 15 has wiring lines, such as image signal lines not shown, and scan lines not shown, extending from the display area 60. An IC driver is later connected to the wiring lines. Further, the terminal portion 15 also has a terminal to input signals and power from an external circuit. For example, a flexible wiring substrate, not shown, is connected to the terminal.

In FIG. 2, the individual liquid crystal cells, which are cut off from the mother panel, are not filled with liquid crystal is not filled yet. Thus, after the individual liquid crystal cells are separated from the mother panel, each liquid crystal cell is filled with liquid crystal through the seal hole 50. Then, the seal hole 50 is sealed with the liquid crystal cell sealant 40 to complete the liquid crystal cell 1.

Figure 5:
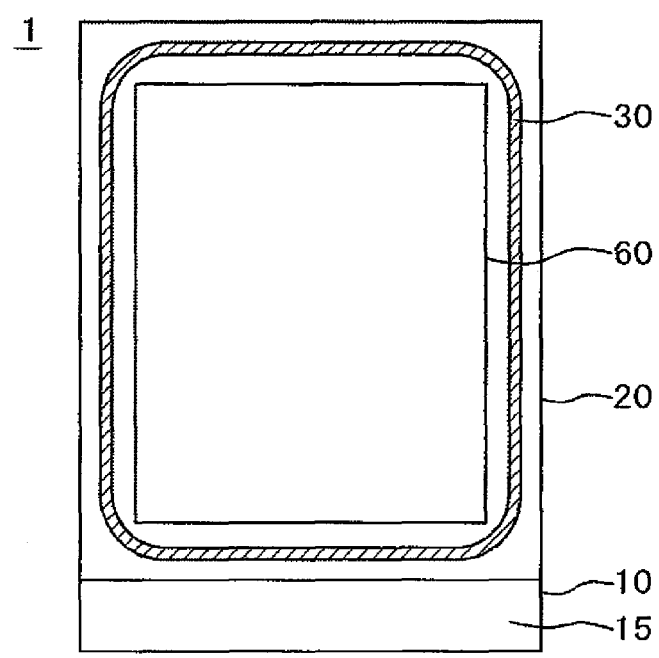
FIG. 5 is a top view of another liquid crystal cell.
Figure 6:
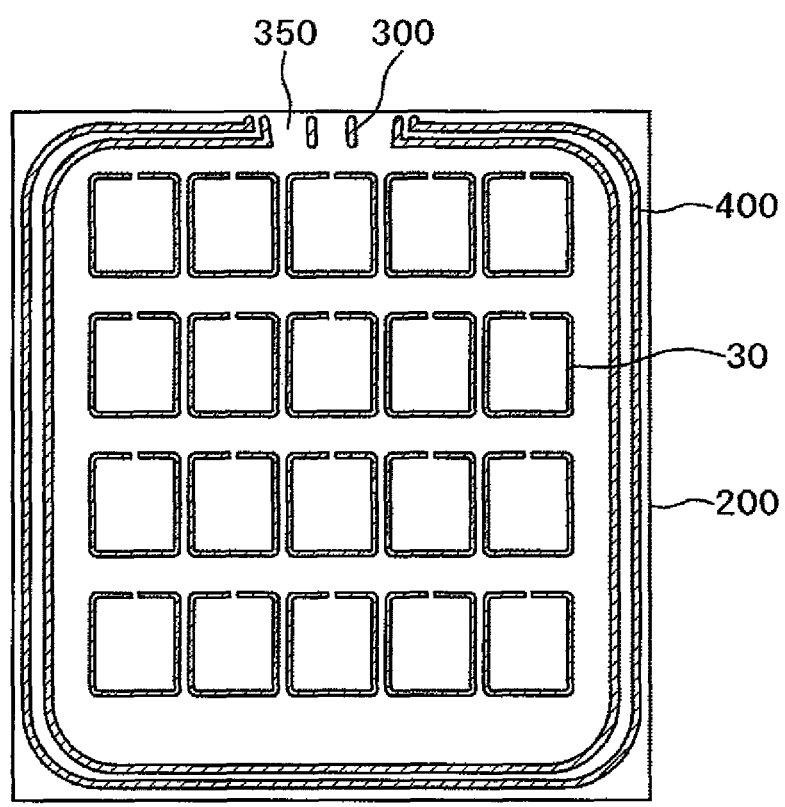
FIG. 6 is a top view of a mother counter substrate in a conventional example.
Figure 7:
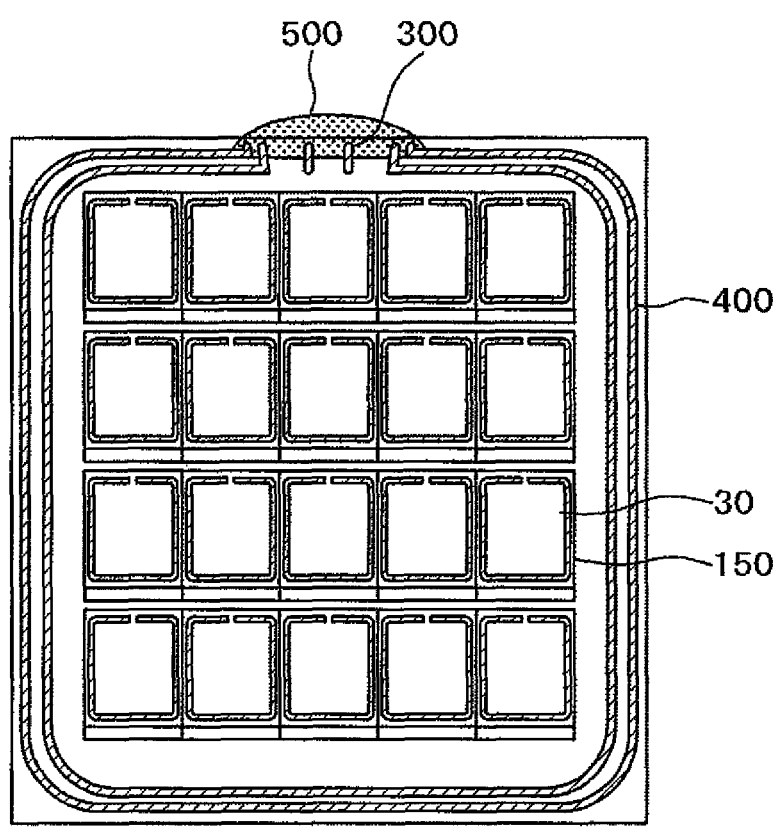
FIG. 7 is a top view of a mother panel in the conventional example.
Figure 8A:
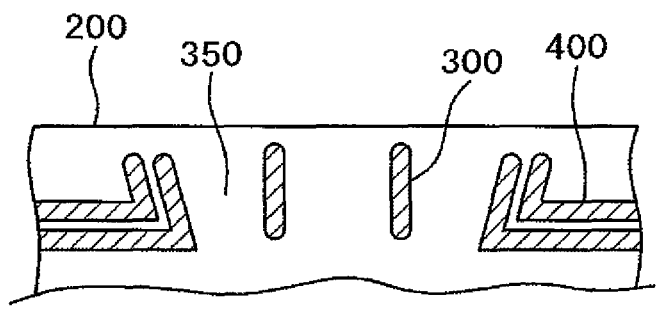
FIGS. 8A and 8B are top views showing the shape of the seal portion of the mother counter substrate, and showing the shape of the seal portion in the state of the mother panel in the conventional example.
Figure 8B:
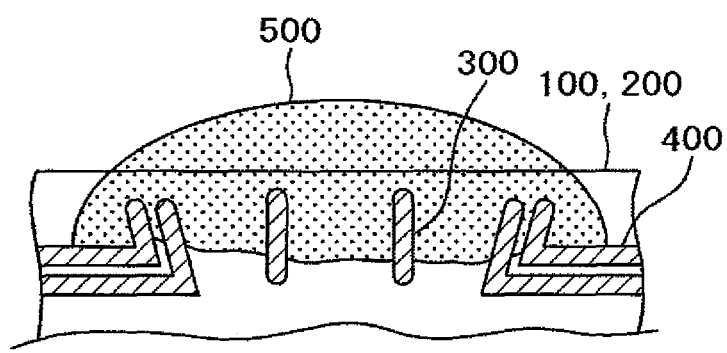

The liquid crystal cells in FIG. 2 are the type in which the liquid crystal is filled later as shown in FIG. 4. However, another technology has also been developed as the manufacturing method of the liquid crystal display panel. In this technology, the individual liquid crystal cells are already filled with liquid crystal when the mother counter substrate 200 and the mother TFT substrate 100 are bonded together. FIG. 5 is a top view of the liquid crystal cell 1 formed by the method described above.

In FIG. 5, the TFT substrate 10 and the counter substrate 20 are bonded together with the liquid crystal cell sealing material 30. The display area 60 is formed inside the liquid crystal cell sealing material 30, which is the same as in FIG. 4. The difference from FIG. 4 is that, in FIG. 5, the seal hole 50 is not formed in the liquid crystal cell sealing material 30. The liquid crystal cell sealing material 30 is formed on the side of the mother counter substrate 200. When the mother counter substrate 200 and the mother TFT substrate 100 are bonded together, liquid crystal is dropped to the inside of the liquid crystal cell sealing material 30. Then, the liquid crystal is filled within the liquid crystal cell sealing material 30 in the state in which the mother counter substrate 200 and the mother TFT substrate 100 are bonded together.

This method requires that the amount of liquid crystal should be precisely controlled. However, there is an advantage that a step of filling the liquid crystal into the liquid crystal cell, and a step of sealing the seal hole 50 with the liquid crystal cell sealant 40 can be omitted in the later process. The present invention can also be applied to the liquid crystal cell 1 of this type. In other words, the difference from FIG. 2 is only that the liquid crystal already exists in the liquid crystal cell sealing materials 30 formed in the mother counter substrate 200, when the mother counter substrate 200 and the mother TFT substrate 100 are bonded together.

As described above, according to the present invention, it is possible to omit the step of sealing the exhaust hole 350 with the sealant when the mother TFT substrate 100 and the mother counter substrate 200 are bonded together to form the mother panel. Thus, the manufacturing process can be shortened. As a result, it is possible to reduce the manufacturing cost of the liquid crystal display device. Further, the absence of sealant prevents the non-uniformity of the thickness in the sealant portion when the mother panel is chemically polished. It is therefore possible to prevent deterioration of the dimension accuracy of the scribing. As a result, it is possible to increase the manufacturing yield of the liquid crystal display device.

Second Embodiment

The first embodiment has been described in terms that the seal portion sealing materials 300 are arranged in a staggered manner in the mother counter substrate 200, and that when the mother counter substrate 200 and the mother TFT substrate 100 are bonded together, the seal portion sealing materials 300 are connected to form a crank shape to seal the interior of the mother panel. However, the present invention is not limited to this configuration, and can be applied to various configurations of the seal portion sealing materials 300.

Figure 9A:
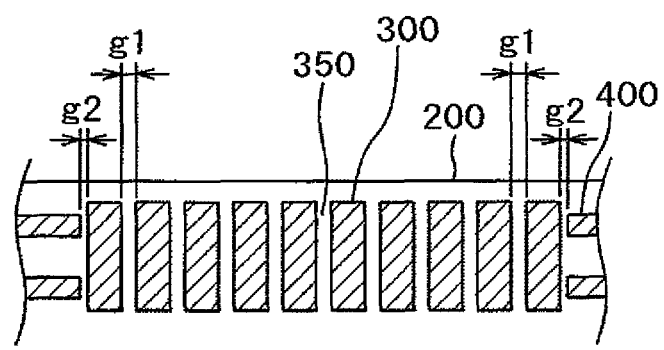
FIGS. 9A and 9B are top views of the seal portion sealing materials according to a second embodiment.
Figure 9B:
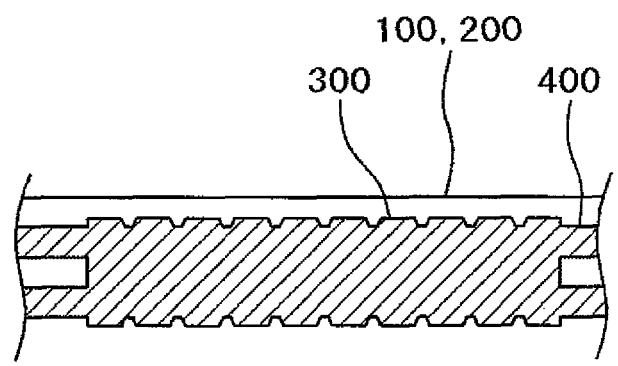

FIGS. 9A and 9B are top views of the seal portion sealing materials 300 according to a second embodiment. The shape of the mother counter substrate 200 or the mother panel in FIGS. 9A and 9B is the same as the case in FIG. 1 or 2. This is the same for the following embodiments. FIG. 9A shows the shape of the seal portion sealing materials 300 of the mother counter substrate 200. In FIG. 9A, the sealing material 400 is doubled. In the seal portion, the seal portion sealing materials 300 having a rectangular shape are arranged at predetermined intervals with a predetermined pitch. When the mother counter substrate 200 and the mother TFT substrate 100 are overlapped with each other, the inside air is let out through the exhaust hole 350.

In FIG. 9A, the sealing material 400 is arranged in two rows. The seal portion sealing materials 300 have a rectangular shape, which are arranged in a single row. The gap g2 between an end portion of the sealing material 400 and the seal portion sealing material 300 is formed smaller than the gap g1 between the seal portion sealing materials 300. The gap g2 can also be set to zero.

The mother counter substrate 200 and the mother TFT substrate 100 are overlapped with each other, and the inside air is let out through the exhaust hole 350. Then, the mother panel is heated. At this time, the rectangular seal portion sealing materials 300 are melted and bridged together to form a single-width row of the seal portion sealing materials 300. As described above, in the second embodiment, the sealing material 400 is arranged in two rows, except for the seal portions in which the seal portion sealing materials 300 are formed to become a single-width line. Although FIGS. 9A and 9B show only one seal portion, the seal portion may be formed on the opposing two sides of the mother counter substrate 200 as shown in FIG. 1 or 2. This is the same for the following embodiments.

In this embodiment, the width of the seal portion sealing materials 300 in the seal portion can be formed greater than the case in the first embodiment. Thus, it is possible to further increase the reliability in the seal portion of the mother panel. Note that although the width of the seal portion sealing materials 300 varies by location, the average width of the seal portion sealing materials 300 can be used to compare with the width of the sealing material 400 of the portion other than the seal portion.

Third Embodiment

Figure 10A:
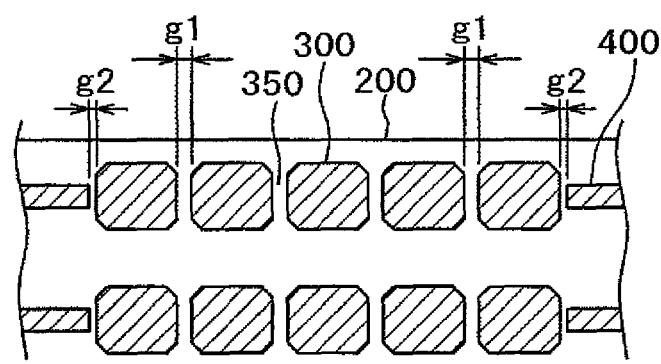
FIGS. 10A and 10B are top views of the seal portion sealing materials according to a third embodiment.
Figure 10B:
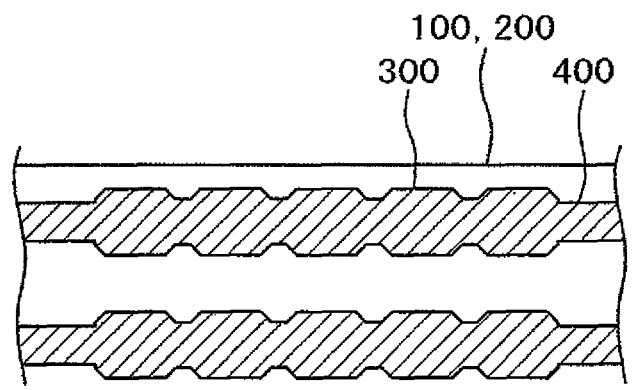

FIGS. 10A and 10B are top views showing another shape of the seal portion sealing materials 300 in the mother counter substrate 200 or the mother panel. FIG. 10A is a top view of the seal portion sealing materials 300 formed in the mother counter substrate 200.

In FIG. 10A, the sealing material 400 is arranged in two rows. The seal portion sealing materials 300 having a substantially rectangular shape are arranged in two rows corresponding to the two rows of the sealing material 400. The gap g2 between an end portion of the sealing material 400 and the seal portion sealing material 300 is formed smaller than the gap g1 between the seal portion sealing materials 300. The gap g2 can also be set to zero.

When the mother TFT substrate 100 and the mother counter substrate 200 are overlapped with each other, the inside air is let out through the exhaust hole 350. Then, the mother panel is heated. At this time, as shown in FIG. 10B, the rectangular seal portion sealing materials 300 are bridged together to seal the interior of the mother panel. In FIG. 10B, the seal portion sealing materials 300 are arranged in two wide rows in the seal portion. In this embodiment, in the state of the mother panel, the width of the seal portion sealing materials 300 is greater than the width of the sealing material 400 of the other portion. Thus, the reliability of sealing of the mother panel is not reduced in the seal portion. Note that although the width of the seal portion sealing materials 300 varies by location, the average width of the seal portion sealing materials 300 can be used to compare with the width of the sealing material 400 of the portion other than the seal portion.

Fourth Embodiment

Figure 11A:
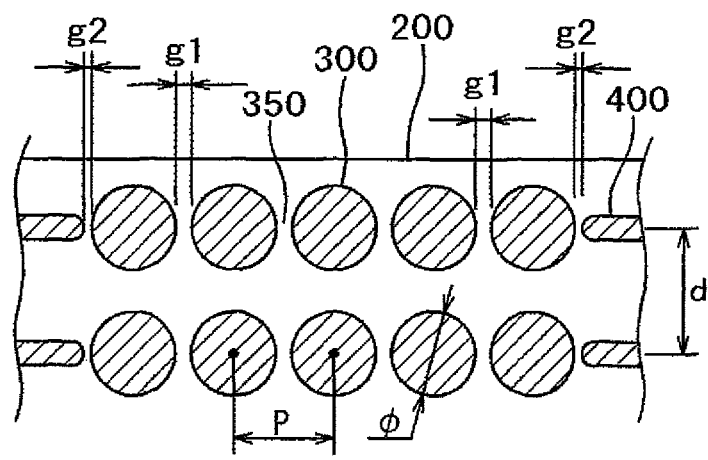
FIGS. 11A and 11B are top views of the seal portion sealing materials according to a fourth embodiment.
Figure 11B:
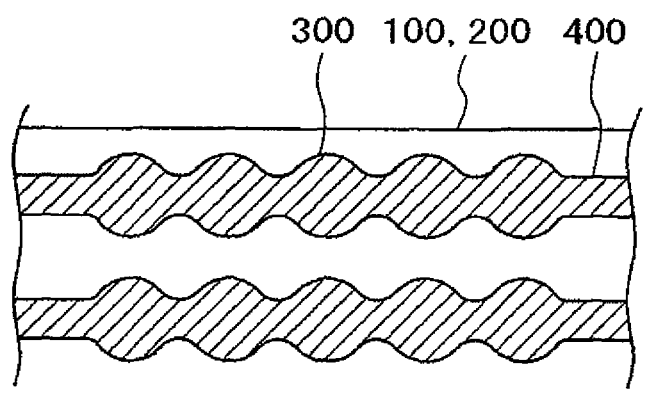

FIGS. 11A and 11B are top views showing still another shape of the seal portion sealing materials 300 in the mother counter substrate 200 or the mother panel. FIG. 11A is a top view of the seal portion sealing materials 300 formed in the mother counter substrate 200.

In FIG. 11A, the sealing material 400 is arranged in two rows. The seal portion sealing materials 300 are arranged in two rows corresponding to the two rows of the sealing material 400. The gap g2 between an end portion of the sealing material 400 and the seal portion sealing material 300 is formed smaller than the gap g1 between the seal portion sealing materials 300. The gap g2 can also be set to zero.

In FIG. 11A, the diameter $\phi$ of the circular seal portion sealing material 300 is, for example, 0.35 mm. The pitch p of the seal portion sealing material 300 is, for example, 0.58 mm. The width w of the sealing material 400 is, for example, 0.18 mm. Further, the center distance d between the two rows of the sealing material 400 or between the two rows of the seal portion sealing material 300 is, for example, 1.15 mm. Further, the gap g1 between the seal portion sealing materials 300 is, for example, 0.18 mm.

When the mother TFT substrate 100 and the mother counter substrate 200 are overlapped with each other, the inside air is let out through the exhaust holes 350. Then, the mother panel is heated. At this time, as shown in FIG. 11B, the circular seal portion sealing materials 300 are bridged together to seal the interior of the mother panel. In this embodiment, similar to the third embodiment, the width of the seal portion sealing materials 300 is greater than the width of the sealing material 400 of the other portion in the state of the mother panel. Thus, the reliability of sealing of the mother panel is not reduced in the seal portion. Note that although the width of the seal portion sealing materials 300 varies by location, the average width of the seal portion sealing materials 300 can be used to compare with the width of the sealing material 400 of the portion other than the seal portion. Further, in this embodiment, the seal portion sealing materials 300 formed in the mother counter substrate 200 have a circular shape, allowing them to be easily bridged together.

Fifth Embodiment

Figure 12A:
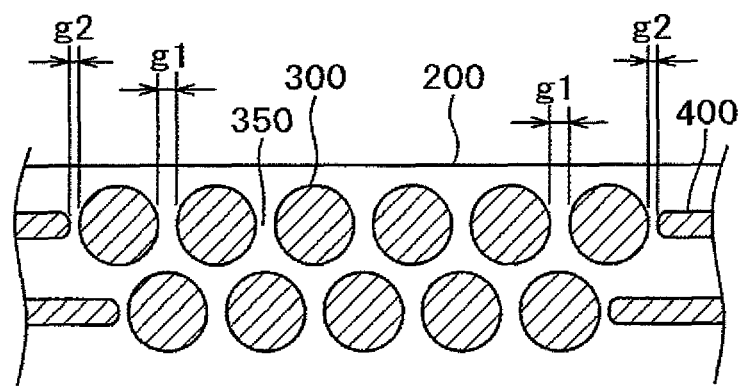
FIGS. 12A and 12B are top views of the seal portion sealing materials according to a fifth embodiment.
Figure 12B:
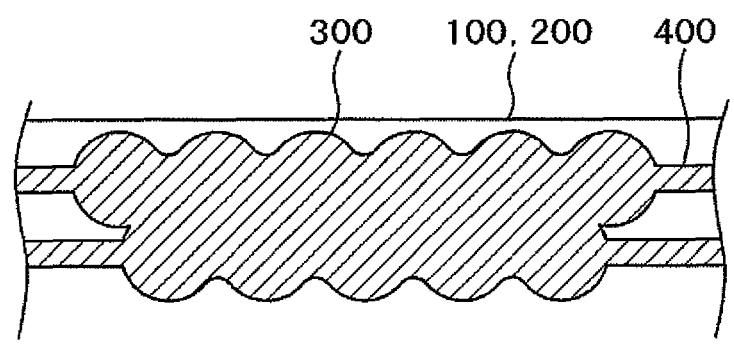

FIGS. 12A and 12B are top views of the seal portion sealing materials 300 according to a fifth embodiment. The shape of the mother TFT substrate 100 or the mother panel is the same as shown in FIG. 1 or 2. FIG. 12A shows the shape of the seal portion sealing materials 300 formed in the mother counter substrate 200. In FIG. 12A, the circular seal portion sealing materials 300 are arranged in two rows at predetermined intervals, which is the same as the case of the fourth embodiment. The difference from the fourth embodiment is that the circular seal portion sealing materials 300 in the fifth embodiment are arranged in a staggered manner. The intervals of the seal portion sealing materials 300 in the staggered arrangement are set so that the circular seal portion sealing materials 300 can easily be melted to each other in the horizontal and diagonal directions.

In FIG. 12A, the sealing material 400 is arranged in two rows, and the seal portion sealing materials 300 are arranged in two rows corresponding to the two rows of the sealing material 400. The gap g2 between an end portion of the sealing material 400 and the seal portion sealing material 300 is formed smaller than the gap g1 between the seal portion sealing materials 300. The gap g2 can also be set to zero.

FIG. 12B is a top view showing the shape of the seal portion sealing materials 300 in the state in which the mother TFT substrate 100 and the mother counter substrate 200 are bonded together to form the mother panel. When the two substrates are heated and bonded together, the seal portion sealing materials 300, which are arranged in two rows in a staggered manner, are melted to each other forming a single-width row of the seal portion sealing materials 300. Note that although the width of the seal portion sealing materials 300 varies by location, the average width of the seal portion sealing materials 300 can be used to compare with the width of the sealing material 400 of the portion other than the seal portion. The fifth embodiment is the same as the first and second embodiments in that the sealing material 400 is arranged in two rows in the portion other than the seal portion, and that the seal portion sealing materials 300 are formed to become a single line in the seal portion. However, in this embodiment, the seal portion sealing materials 300 have a circular shape, allowing them to be easily bridged together.

Sixth Embodiment

Figure 13A:
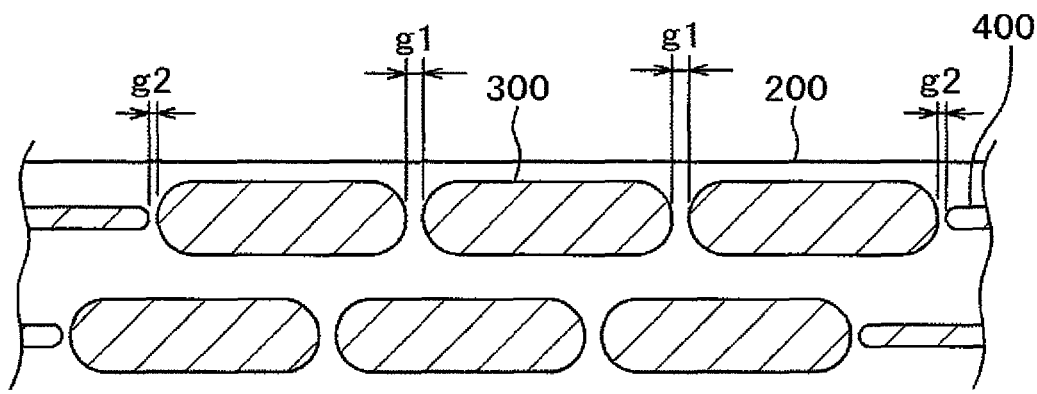
FIGS. 13A and 13B are top views of the seal portion sealing materials according to a sixth embodiment.
Figure 13B:
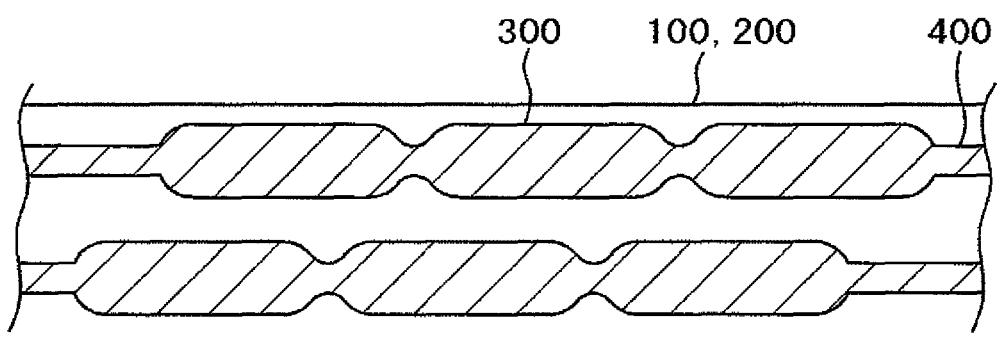

FIGS. 13A and 13B are top views of the seal portion sealing materials 300 according to a sixth embodiment. FIG. 13A is a top view of the seal portion sealing materials 300 formed in the mother counter substrate 200. In FIG. 13A, the seal portion sealing materials 300 have an oval shape elongated in the lateral direction, which are arranged in two rows in the seal portion. The oval seal portion sealing materials 300 are arranged in two rows corresponding to the two rows of the sealing material 400. The gap g2 between an end portion of the sealing material 400 and the seal portion sealing material 300 is formed smaller than the gap g1 between the seal portion sealing materials 300. The gap g2 can also be set to zero.

When the mother TFT substrate 100 and the mother counter substrate 200 are overlapped with each other, the inside air is let out through the exhaust holes 350. Then, the mother panel is heated. At this time, as shown in FIG. 13B, the oval seal portion sealing materials 300 are bridged together to seal the interior of the mother panel. In this embodiment, the shape of the seal portion sealing materials 300 is similar to the shape of the third embodiment, except that the seal portion sealing materials 300 have an oval shape. In other words, the sealing material 400 is arranged in two rows along the entire periphery of the mother counter substrate 200, except for the seal portions in which the width of the seal portion sealing materials 300 increases. For this reason, the reliability of sealing in the seal portion is not reduced. Note that although the width of the seal portion sealing materials 300 varies by location, the average width of the seal portion sealing materials 300 can be used to compare with the width of the sealing material 400 of the portion other than the seal portion.

In this embodiment, the seal portion sealing materials 300 have an oval shape. Thus, when the mother counter substrate 200 and the mother TFT substrate 100 are overlapped and heated, the seal portion sealing materials 300 can easily be bridged together compared to the case of the third embodiment.

The above embodiments have been described on the assumption that the shape of the mother counter substrate 200 or the mother panel is the same as in the first embodiment in FIG. 1 or 2, except for the seal portion. In other words, the seal portion sealing materials 300 are formed on the opposing two short sides of the mother counter substrate 200. However, the present invention is not limited to this configuration. The present invention can also be applied to the case in which the seal portion sealing materials 300 in each embodiment are formed on only one short side, or formed on a long side.

In the above description, the seal portion sealing materials 300 are arranged in a single row or in two rows. However, it is also possible that the seal portion sealing materials 300 are arranged in three rows or more. In this case, the sealing material 400 other than the seal portion sealing materials 300 may be arranged in two rows, and the seal portion sealing materials 300 may be arranged in three rows or more. Then, the seal portion sealing materials 300, for example, arranged in three rows, has a shape capable of being bridged to the main sealing material 400 arranged in two rows, when the mother TFT substrate and the mother counter substrate are bonded together.

What is claimed is:

1. A mother panel comprising:
    a mother TFT substrate;
    a mother counter substrate bonded to the mother TFT substrate; and
    a plurality of liquid crystal cells;
    wherein the mother TFT substrate and the mother counter substrate are bonded together with a sealing material provided in the periphery surrounding the plurality of liquid crystal cells;
    wherein the sealing material includes a first sealing material of a seal portion in the periphery as well as a second sealing material of an other portion in the periphery so as to enable air tight sealing within the periphery of an interior of the bonded together mother TFT substrate and the mother counter substrate forming the mother panel and containing the plurality of liquid crystal cells therein;
    wherein the second sealing material of the other portion in the periphery is arranged in two rows;
    wherein the first sealing material of the seal portion in the periphery is arranged in at least one row; and
    wherein no sealant other than the first sealing material is formed in the seal portion in the periphery so as to enable the air tight sealing in the periphery of the mother panel.

2. A mother panel comprising:
    a mother TFT substrate;
    a mother counter substrate bonded to the mother TFT substrate; and
    a plurality of liquid crystal cells;
    wherein the mother TFT substrate and the mother counter substrate are bonded together with a sealing material provided in the periphery surrounding the plurality of liquid crystal cells;
    wherein the sealing material includes a first sealing material of a seal portion in the periphery as well as a second sealing material of an other portion in the periphery so as to enable air tight sealing within the periphery of an interior of the bonded together mother TFT substrate and the mother counter substrate forming the mother panel and containing the plurality of liquid crystal cells therein;

wherein the second sealing material of the other portion in the periphery is arranged in two rows;

wherein the first sealing material of the seal portion in the periphery is arranged in a single row; and wherein no sealant other than the first sealing material is formed in the seal portion in the periphery so as to enable the air tight sealing in the periphery of the mother panel.

3. A mother panel comprising:

a mother TFT substrate;

a mother counter substrate bonded to the mother TFT substrate; and a plurality of liquid crystal cells;

wherein the mother TFT substrate and the mother counter substrate are bonded together with a sealing material provided in the periphery surrounding the plurality of liquid crystal cells;

wherein the sealing material includes a first sealing material of a seal portion in the periphery as well as a second sealing material of an other portion of the periphery so as to enable air tight sealing within the periphery of an interior of the bonded together mother TFT substrate and the mother counter substrate forming the mother panel and containing the plurality of liquid crystal cells therein;

wherein the second sealing material of the other portion in the periphery is arranged in two rows;

wherein the first sealing material of the seal portion in the periphery is arranged in a single row with a substantially crank shape; and wherein no sealant other than the first sealing material is formed in the seal portion in the periphery so as to enable the air tight sealing in the periphery of the mother panel.

4. A mother panel according to claim 1, wherein the first sealing material of the seal portion is arranged in two rows, and wherein a width of the first sealing material of the seal portion is greater than a width of the second sealing material of the other portion.

5. A mother panel according to claim 2, wherein a width of the first sealing material of the seal portion is greater than a width of the second sealing material of the other portion.

6. A mother panel according to claim 3, wherein a width of the seal portion sealing material is greater than a width of the sealing material of the other portion.

* * * * *